United States Patent [19]

Nagasawa et al.

[11] Patent Number: 5,846,307

[45] Date of Patent: Dec. 8, 1998

[54] AQUEOUS PIGMENT INK COMPOSITION

[75] Inventors: Toshiyuki Nagasawa, Yawata; Sohko Itoh; Yoichi Ueda, both of Neyagawa, all of Japan

[73] Assignee: Orient Chemical Industries, Ltd., Osaka-fu, Japan

[21] Appl. No.: 842,785

[22] Filed: Apr. 16, 1997

[30] Foreign Application Priority Data

Apr. 19, 1996 [JP] Japan ..................................... 8-098436
Jun. 21, 1996 [JP] Japan ..................................... 8-161946

[51] Int. Cl.⁶ .................................................... C09D 11/02
[52] U.S. Cl. ..................................... 106/31.75; 106/31.65; 106/478
[58] Field of Search ............................. 106/31.65, 31.75, 106/31.9, 478

[56] References Cited

U.S. PATENT DOCUMENTS

| | | | |
|---|---|---|---|
| 2,641,533 | 6/1953 | Cines et al. | 106/478 |
| 3,279,935 | 10/1966 | Daniell et al. | 106/478 |
| 3,791,840 | 2/1974 | Barr | 106/478 |
| 5,228,911 | 7/1993 | Kunii et al. | 106/478 |
| 5,609,671 | 3/1997 | Nagasawa | 106/478 |

*Primary Examiner*—Helene Klemanski
*Attorney, Agent, or Firm*—Birch, Stewart, Kolasch & Birch, LLP

[57] ABSTRACT

Disclosed is an aqueous pigment ink composition comprising water and oxidized carbon black dispersed stably in the water, wherein said oxidized carbon black is obtained by oxidizing carbon black using hypohalous acid and/or salt thereof and wherein at least a part of an acidic group existing on the surface of said oxidized carbon black associates with an amine compound to form an ammonium salt. The aqueous pigment ink composition realizes smooth printing with ink jet nozzle, and smooth writing with fine pen tip and it has sufficient density. Further, the recorded traces obtained by using the ink composition is excellent in water resistance.

15 Claims, No Drawings

AQUEOUS PIGMENT INK COMPOSITION

FIELD OF THE INVENTION

The present invention relates to an aqueous pigment ink composition, particularly an aqueous pigment ink composition comprising carbon black as a coloring agent, of which water-dispersibility is improved.

BACKGROUND OF THE INVENTION

An aqueous dye ink composition comprising black dye has been mainly used as a recording liquid for a writing implement and an ink jet printer. Recently, notice has been made on an aqueous pigment ink composition in which a pigment such as a carbon black is included to get the light resistance and water resistance of the resulting recorded traces.

In this type of pigment ink composition, an acidic carbon black commercially available as a coloring agent is often included. The acidic carbon black shows acidic pH, and it is believed that an acidic group such as a carboxyl group exists on the surface thereof. The acidic carbon black is generally obtained, by oxidizing carbon black for coloring such as furnace black and channel black according to a usual method. A liquid phase or gas phase oxidation method using a usual oxidizing agent such as nitric acid, ozone, hydrogen peroxide and nitrogen oxides, or a surface modifying method such as plasma treatment and the like, are employed.

The acidic carbon black shows a certain hydrophilicity, however, affinity and dispersion stability to aqueous medium is insufficient. Therefore, it is not easily dispersed in water alone. Then, when the acidic carbon black is used as a coloring agent for an aqueous pigment ink composition, the acidic carbon black is necessary to be dispersed and stabilized in an aqueous medium by using a dispersing machine, in the presence of what is called a pigment dispersing agent such as various synthetic polymers and surface active agents.

For example, in Japanese Patent Kokai Publication No. 6074/1989 and 31881/1989, there is described an aqueous pigment ink composition comprising pigment dispersing agents (an anionic surface active agent and a polymeric dispersant) and carbon black having a pH value of not more than 5. Further, in Japanese Patent Kokai Publication No. 210373/1991, there is described an ink composition for ink jet recording, comprising a water-soluble resin and acidic carbon black of which volatile content is from 3.5 to 8% by weight. Also, in Japanese Patent Kokai Publication 134073/1991, there is described a recording liquid for ink jet recording, comprising a water-soluble resin and a neutral or basic carbon black.

In general, for stable discharge of droplets from the minute point of an ink jet recording head, and for smooth writing with the fine pen tip of an aqueous ball-point pen, it is required to prevent setting of the ink at the orifice of the ink jet recording head or at the tip of the ball-point pen.

However, when commercially available carbon black is used, the resulting pigment ink composition essentially comprises a pigment dispersing agent. A resin which constitutes the pigment dispersing agent easily adheres to an orifice and the like, and it hardly dissolves again, therefore, clogging or no-discharge of droplets often occurs. Further, an aqueous pigment ink composition containing a pigment dispersing agent is viscous, and it makes resistance in the route leading to a nozzle tip, when high-speed printing, or continuous discharging for a long period of time is conducted. Therefore, the discharging becomes unstable and smooth recording becomes difficult. Further, in the conventional aqueous pigment ink composition, the pigment concentration can not be increased sufficiently, because discharging stability have to be maintained, and consequently, density of the resulting recorded traces becomes insufficient by comparison with an aqueous dye ink composition.

In order to solve the above-described problems, the present inventors provide an aqueous pigment ink composition comprising no pigment dispersing agent. In the aqueous pigment ink composition described herein, the water dispersibility of carbon black used as a coloring agent is remarkably improved, and a resinous component such as a pigment dispersing agent is not included. Therefore, this aqueous pigment ink composition does not cause clogging in a nozzle when it is used for ink jet recording, enables smooth writing with a fine pen point, and has sufficient density.

The present inventors also provide an aqueous pigment ink composition which achieves smooth writing, and sufficient density and improved water resistance of the recorded traces.

SUMMARY OF THE INVENTION

The present invention provides an aqueous pigment ink composition comprising water and oxidized carbon black dispersed stably in the water, wherein said oxidized carbon black is obtained by oxidizing carbon black using hypohalous acid and/or salt thereof and wherein at least a part of an acidic group existing on the surface of said oxidized carbon black associates with an amine compound to form an ammonium salt.

The pigment ink composition of the present invention includes no pigment dispersant. It does not cause agglomeration of the carbon black in the ink and has excellent dispersion stability in storage. The aqueous pigment ink composition of the present invention does not cause clogging in a nozzle when it is used for ink jet recording, enables smooth writing with a fine pen point. It also provides sufficient density and improved water resistance of the recorded traces.

The aqueous pigment ink composition comprising water and oxidized carbon black dispersed stably in the water is preferably produced by a process which comprises the steps of:

oxidizing carbon black in the condition that the carbon black is finely dispersed in water, using hypohalous acid and/or salt thereof; and neutralizing at least a part of an acidic group existing on the surface of the resulting oxidized carbon black, with an amine compound.

The aqueous pigment ink composition of the present invention may comprise a certain water-soluble resin in an amount that the objects of the present invention is not disturbed. The water-soluble resin is preferably an acrylic polymer having a weight average molecular weight of not more than 50000 and an acid value of from 100 to 250.

In this case, the oxidized carbon black is preferably prepared by a process comprising the steps of:

(a) finely dispersing carbon black in water, (b) oxidizing the carbon black using hypohalous acid and/or salt thereof, and (c) purifying and concentrating to obtain an aqueous dispersion having a pigment concentration of from 10 to 30% by weight, after steps (a) and (b). Steps (a) and (b) may be conducted simultaneously, and thereafter, a part of the basic groups may be neutralized by a volatile base compound.

DETAILED DESCRIPTION OF THE INVENTION

The oxidized carbon black included in the aqueous pigment ink composition of the present invention is obtained by wet-oxidizing carbon black, using hypohalous acid and/or salt thereof. The carbon black which is employed as a raw material of the oxidized carbon black is, in general, carbon powder which is obtained by thermal decomposition or incomplete combustion of natural gas or liquid hydrocarbon (heavy oil, tar or the like). The carbon black is classified into channel black, furnace black, lump black and the like depending on the production method, and commercially available.

The kind of the carbon black used as a raw material is not particularly limited. Any of the above-described acidic carbon black, neutral carbon black and alkaline carbon black, may be employed.

The specific example of the carbon black includes #10B, #20B, #30, #33, #40, #44, #45, #45L, #50, #55, #95, #260, #900, #1000, #2200B, #2300, #2350, #2400B, #2650, #2700, #4000B, CF9, MA8, MA11, MA77, MA100, MA220, MA230, MA600, MCF88 and the like manufactured by Mitsubishi Kagaku K.K.; Monarch 120, Monarch 700, Monarch 800, Monarch 880, Monarch 1000, Monarch 1100, Monarch 1300, Monarch 1400, Mogal L, Legal 99R, Legal 250R, Legal 300R, Legal 330R, Legal 400R, Legal 500R, Legal 660R and the like manufactured by Cabot Corp.; Printex A, Printex G, Printex U, Printex V, Printex 55, Printex 140U, Printex 140V, Special black 4, Special black 4A, Special black 5, Special black 6, Special black 100, Special black 250, Color black FW1, Color black FW2, Color black FW2V, Color black FW18, Color black FW200, Color black S150, Color black S160, Color black S170 and the like manufactured by Degussa Corp.

The acidic carbon black is preferable, since it carries an acidic group such as phenolic hydroxyl group, carboxyl group and the like on the surface of the particle. The acidic carbon black has a pH value usually of not more than 6, preferably not more than 4.

The acidic carbon black is commercially available, specifically, in the trade name of MA8, MA100, 2200B, 2400B from Mitsubishi Kagaku K.K., in the trade name of Color black FW200, Color black FW18, Color black S150, Color black S160, Color black S170, Printex U, Printex 1400 from Degussa Corp., in the trade name of Monarch 1300, Mogal L, Legal 400R from Cabot Corp., in the trade name of Raben 1200, Raben 1220, Raben 1225 from Columbian Carbon Corp.

The carbon black is then wet-oxidized in water using hypohalous acid and/or salt thereof. The specific example of the hypohalous acid and/or salt thereof includes sodium hypochlorite and potassium hypochlorite, and sodium hypochlorite is preferred due to its high reactivity.

The oxidation reaction is conducted by charging carbon black and hypohalite (for example, sodium hypochlorite) into suitable amount of water, and by stirring the resulting mixture at a temperature of not less than 50° C., preferably from 95° to 105° C. for not less than 5 hours, preferably about 10 to 15 hours. Throughout the procedure, it is preferable that the carbon black is finely dispersed in the water.

In this specification, the term "finely dispersed" means that the secondary particle of the carbon black is finely ground to the level of the primary particle. The finely dispersed carbon black has an average particle size of usually not more than 300 nm, preferably not more than 150 nm, more preferably not more than 100 nm.

In general, carbon black is finely dispersed by wet-grinding for 3 to 10 hours in an aqueous medium using a mill medium and a grinding apparatus. As the mill medium, glass beads, zirconia beads, magnetic beads, stainless beads and the like are used. As the grinding apparatus, a ball mill, atoritor, flow jet mixer, impeller mill, colloidal mill, sand mill (for example, those commercially available in the trade name of "Super mill", "Agitator mill", "Daino mill", "Beads mill") and the like, are used.

However, some carbon black is finely dispersed only by high-speed stirring in water, depending on the kind thereof.

The finely dispersing step is generally conducted before oxidizing step, but the finely dispersing step may be conducted simultaneously with the oxidizing step, by stirring or grinding carbon black in an aqueous solution of hypohalite.

The amount used of hypohalite differs depending on the kind thereof, and is usually from 1.5 to 150% by weight, preferably from 4 to 75% by weight in terms of 100% by weight based on the weight of carbon black.

The resulting oxidized carbon black has an oxygen content of not less than about 3% by weight, preferably not less than about 5% by weight, more preferably not less than about 10% by weight. The oxygen content increases to several to scores times (for example, about 1.5 to about 30 times, further up to about 100 times) by comparison with those of the carbon black before the oxidizing step according to the method of the present invention.

The oxygen content is measured by "the inert gas-infrared absorption method". In this method, the sample is heated in an inert gas flow such as helium, oxygen is extracted as carbon monoxide, and it was measured by the infrared absorption method.

The feature of the aqueous pigment ink composition of the present invention is not limited to the oxygen content of the oxidized carbon black. Though the reason is not clear, the oxidized carbon black of the present invention forms more stable aqueous dispersion by comparison with commercially available acidic carbon black, even if the oxygen content is from 3 to 10% by weight.

In the reaction between carbon black and hypohalite, it is generally explained that various functional groups existing on the surface of the carbon black are oxidized, and a carboxyl group and hydroxyl group are formed. These polar groups have active hydrogen, and the amount thereof can be measured by, for example, the Zeisel method.

The oxidized carbon black used in the aqueous pigment ink composition of the present invention preferably has high surface active hydrogen content (mmol/g). The reason is that the oxidized carbon black having high surface active hydrogen content shows particularly excellent water dispersibility. The surface active hydrogen content of the oxidized carbon black included in the aqueous pigment ink composition of the present invention is not particularly limited, and is generally about 0.1 to about 1.0 mmol/g, or not less than about 0.3 mmol/g, preferably not less than about 0.5 mmol/g, more preferably not less than about 1.0 mmol/g.

In general, carbon black having high surface active hydrogen content, carries a lot of hydroxyl groups and carboxyl groups which have active hydrogen on the surface thereof, and hydrophilicity of the carbon black itself is increased. The surface area of the carbon black increases at the same time. As a result, the carbon black has the chemical property like an acidic dye, and water dispersibility becomes excellent.

The feature of the aqueous pigment ink composition of the present invention is not limited to the surface active hydrogen content of the oxidized carbon black. That is, not all the carbon black having an active hydrogen content of from about 0.1 to about 1.0 mmol/g achieve the objects of the present invention.

The dispersion of the oxidized carbon black after the oxidizing step is filtrated (with heating), the resulting wet cake is dispersed again in water, thereafter, beads and coarse particles are removed by using a mesh type wire fabric. Otherwise, after the beads and the coarse particles are removed, the resulting wet cake may be washed with water to remove by-produced salt. Alternatively, the slurry from which the beads and the coarse particles have been removed may be diluted with a large amount of water, and film purification and concentration may be conducted.

The wet cake of this oxidized carbon black is optionally dispersed again in water, and is acid-treated using mineral acid (for example, hydrochloric acid and sulfuric acid). The acid-treatment is preferably conducted by controlling the pH value of the aqueous dispersion to not more than 3, by adding hydrochloric acid, and heating at a temperature of not less than 80° C. for 1 to 5 hours with stirring. The acid-treatment is preferred, because, the formation of an ammonium salt or amine salt by aqueous ammonia or amine compound in the next step becomes advantageous by the acid-treatment. The acid-treatment removes sodium or potassium derived from an oxidation agent, in the form of salt. Then, the dispersion is filtrated and washed with water, and the resulting wet cake is dispersed again in water.

The dispersion of the oxidized carbon black is then optionally neutralized with a basic compound, preferably an amine compound. There are a lot of acidic groups on the surface of the oxidized carbon black, and at least a part of them (ionically) associates with an amine compound to form ammonium salt or amine salt. In this way, by neutralizing the oxidized carbon black with an amine compound, dispersion stability, prevention of clogging in a nozzle, and water resistance of recorded traces, of the aqueous pigment ink composition are improved.

The preferable amine compound includes a water-soluble volatile amine, alkanolamine and the like. The specific example includes ammonia, volatile amine substituted by an alkyl group having 1 to 3 carbon atoms (for example, methylamine, trimethylamine, diethylamine, propylamine); alkanolamine substituted by an alkanol group having 1 to 3 carbon atoms (for example, ethanolamine, diethanolamine, triethanolamine); alkylalkanolamine substituted by an alkanol group having 1 to 3 carbon atoms and an alkyl group having 1 to 3 carbon atoms, and the like. The particularly preferable amine compound is ammonia. However, it is not required that all the acidic groups are made into ammonium salt or amine salt.

These can be used in combination of more than one. Affinity and dispersion stability to an aqueous medium may be controlled. A part of the acidic groups which exist on the surface of the oxidized carbon black may be made into an alkaline metal salt in order to prevent metal corrosion. In this case, sodium hydroxide, potassium hydroxide, lithium hydroxide and the like are used as a basic compound in combination with the amine compound.

Thereafter, the dispersion of the oxidized carbon black which has been made into amine salt is purified and concentrated, by using a separation film having a pore size of not more than 0.01 μm, such as a reverse osmosis membrane and ultrafiltration film. The concentration is generally conducted to obtain a concentrated pigment dispersion which has a carbon black content of from 10 to 30% by weight based on water. The resulting pigment dispersion can be used as an aqueous pigment ink composition. The concentration of the carbon black is however preferably controlled from 1 to 20% by weight. The concentrated pigment dispersion may be further dried to be powdery pigment, or may be further concentrated to be pigment dispersion having a pigment concentration of 50% by weight. Thereafter, these are dispersed in the aqueous medium described below, and concentration is suitably controlled to obtain the aqueous pigment ink composition of the present invention.

It is desirable that the oxidized carbon black used in the present invention is included in an amount usually from 0.1 to 50% by weight, preferably from 2 to 20% by weight, more preferably from 5 to 10% by weight based on the total amount of the aqueous pigment ink composition. When the carbon black content is less than 1% by weight, printing or writing density becomes insufficient, and when more than 20% by weight, the carbon black easily flocculates, or precipitates during storage for a long period, and discharging stability becomes poor.

The carbon black used in the aqueous pigment ink composition of the present invention has an average particle size of not more than 300 nm, preferably not more than 150 nm, more preferably not more than 100 nm. When the average particle size of the carbon black is more than 300 nm, the carbon black easily precipitates.

The aqueous pigment ink composition of the present invention preferably further comprises a water-soluble resin. It is for the improvement of water resistance of a recorded traces which are obtained by recording with the aqueous pigment ink composition.

This water-soluble resin is different from those conventionally employed as a pigment dispensing agent. The water-soluble resin do not have sufficient ability to disperse pigment. The reason for this is that the oxidized carbon black itself has excellent dispersibility and re-dispersibility in an aqueous medium.

In general, when lipophilic carbon black is dispersed in an aqueous solvent, a pigment dispersing agent should have a hydrophilic group and a lipophilic group arranged in good valance, and the lipophilic group should be adsorbed on the surface of the carbon black. However, the resin used in the present invention do not have to be adsorbed on the surface of the carbon black, and the lipophilic group may be weak by comparison with that of the usual pigment dispersing agent, and the arrangement thereof is not particularly limited. For example, a resin such as a block copolymer can be used without problems, as the water-soluble resin.

The dispersion stability and discharge stability of the aqueous pigment ink composition should not be lost by inclusion of the water-soluble resin. It is therefore necessary that the water-soluble resin prevents carbon black to become bulky agglomerates in drying. That is, the water-soluble resin have to cover the fine particles of the carbon black. Thereby, setting of the ink composition in an orifice or nozzle is avoided, and speedy re-dissolution is achieved.

The water-soluble resin like that is generally an acrylic polymer having a weight average molecular weight of not more than 50000, preferably from 30000 to 1000, more preferably from 20000 to 1000, and having an acid value of from 100 to 250, preferably from 150 to 250. It is particularly preferable that these resins are soluble in an aqueous solution of an amine compound.

If the weight average molecular weight is not less than 50000, viscosity of the ink composition and particle size of the dispersion increases, and discharge stability may become poor. And if the acid value is not more than 100, re-dissolution property of the resin becomes undesirably poor. If the acid value is not less than 250, water-solubility becomes too high, and the water resistance of the resulting recorded traces becomes undesirably poor.

It is preferable that the water-soluble resin has a glass transition temperature of from 20° to 150° C., preferably from 30° to 100° C. If the glass transition temperature of the water-soluble resin is less than 20° C., printed ink becomes hard to dry, and tackiness remains undesirably for a long period. If more than 150° C, printed ink becomes hard and brittle, and cracks in bending may occur.

In the present specification, the term "acrylic polymer" means a polymer which is composed of at least one acrylic monomer such as acrylic acid, methacrylic acid, acrylate and methacrylate, and which has a carboxyl group.

The acrylic polymer is prepared by polymerizing the anionic monomers and nonionic monomers as exemplified below, in various ratio.

The example of the anionic monomers includes a monobasic acid unsaturated monomer such as acrylic acid and methacrylic acid, a dibasic acid unsaturated monomer such as maleic acid and itaconic acid, and a dibasic monoester such as monomethyl maleate and monobutyl itaconate.

The example of the nonionic monomer includes a (meth)acrylate such as methyl acrylate, ethyl acrylate, butyl acrylate, isobutyl acrylate, methyl methacrylate, ethyl methacrylate, isobutyl methacrylate, octyl methacrylate, 2-ethylhexyl methacrylate, lauryl methacrylate, dodecyl methacrylate, stearyl methacrylate, cyclohexyl methacrylate, benzyl methacrylate, 2-hydroxyethyl methacrylate, 2-hydroxypropyl methacrylate, glycidyl methacrylate, tetrahydrofuryl methacrylate, diethylene glycol mono (meth)acrylate, dipropylene glycol mono (meth)acrylate, ethylene glycol dimethacrylate, triethylene glycol dimethacrylate, tetraethylene glycol dimethacrylate, 1,3-butylene glycol dimethacrylate, trimethylolpropane trimethacrylate and the like; a dibasic ester such as dimethyl maleate, dibutyl maleate and the like; an aromatic vinyl monomer such as styrene, a-methylstyrene, vinyltoluene and the like; and a vinyl monomer such as acrylonitrile, methacrylonitrile, vinyl chloride, vinyl acetate and the like.

The specific example includes an acrylic acid-alkyl (meth)acrylate copolymer, methacrylic acid-alkyl (meth)acrylate copolymer, (meth)acrylic acid-maleic acid half ester copolymer, (meth)acrylic acid-dialkyl maleate copolymer, maleic acid-alkyl (meth)acrylate copolymer, itaconic acid-alkyl (meth)acrylate copolymer, methacrylic acid-2-hydoxyethyl (meth)acrylate copolymer, methacrylic acid-diethylene glycol (meth)acrylate copolymer, methacrylic acid-glycidyl methacrylate copolymer, styrene-acrylic acid copolymer, styrene-methacrylic acid copolymer, styrene-methacrylic acid-alkyl (meth)acrylate copolymer, styrene-maleic acid-alkyl (meth)acrylate copolymer and the like.

The acrylic polymer may be modified, by using a natural resin such as a rosin resin and a synthetic resin such as alkyd resin, epoxy resin, melamine resin, polyester, polyvinyl alcohol, polyether and the like.

The water-soluble resin which can be used in the aqueous pigment ink composition of the present invention is commercially available, and the example thereof includes, for example, a rosin-modified acrylic resin "Mulkyd 32" manufactured by Arakawa Kagaku Kogyo K.K., a styrenemaleic acid-modified acrylic resin "Johncryl J501" manufactured by Johnson Polymer K.K., and the like.

The acrylic polymer is preferably neutralized by a volatile basic compound selected from ammonia, amine, alkanolamine and alkylalkanolamine, and is dissolved in an aqueous medium. The acrylic polymer is contained in an amount of from 0.1 to 20% by weight, preferably from 0.5 to 10% by weight, more preferably from 1 to 5% by weight based on the total amount of the aqueous pigment ink composition of the present invention. The acrylic polymer is included in an amount of preferably from 10 to 100% by weight based the oxidized carbon black contained in the ink composition of the present invention.

The aqueous pigment ink composition of the present invention may optionally comprise a water-miscible organic solvent. In this specification, water, the water-miscible organic solvent and a mixture thereof are referred to as an aqueous medium.

The example of the water-miscible organic solvent includes an alkylalcohol having 1 to 4 carbon atoms such as methyl alcohol, ethyl alcohol, n-propyl alcohol, isopropyl alcohol, n-butyl alcohol, sec-butyl alcohol and isobutyl alcohol; ketone or ketone alcohol such as acetone and diacetone alcohol; ether such as tetrahydrofuran (THF) and dioxane; alkylene glycol such as ethylene glycol, propylene glycol, diethylene glycol and triethylene glycol; polyalkylene glycol such as polyethylene glycol and polypropylene glycol; lower alkyl ether of polyhydric alcohol such as ethylene glycol monoethyl ether, propylene glycol monomethyl ether, diethylene glycol monomethyl ether and triethylene glycol monoethyl ether; lower alkyl ether acetate such as polyethylene glycol monomethyl ether acetate; glycerine; and pyrrolidone such as 2-pyrrolidone, 2-methylpyrrolidone and N-methyl-2-pyrrolidone. The amount used of these organic solvents is not particularly limited, and usually in the range of from 3 to 50% by weight.

The aqueous pigment ink composition of the present invention is sufficiently desalted and purified, and there occurs no corrosion in writing implements, ink jet printer and the like. Further, the most of or a part of the carboxyl groups on the surface of the carbon black are converted to an ammonium salt, and there is no particular need to control pH. A part of the carboxyl groups may be converted to an alkaline metal salt by using alkaline metal (Na, K) salt of a hypohalous acid.

The aqueous pigment ink composition of the present invention, may comprises additives such as a viscosity regulating agent, mildewproofing agent and rustproofing agent which are usually used in this kind of the ink composition, in an appropriate amount.

According to the present invention, there is provided an ink composition which contains highly oxidized carbon black having excellent water dispersibility by comparison with (acidic) carbon black which is commercially available as a coloring agent. It is believed that the amount of the polar group (for example, hydroxyl group and carboxyl group) on the surface is increased, and the surface area is enlarged at the same time, in the highly oxidized carbon black.

The aqueous pigment ink composition of the present invention shows excellent dispersion stability for a long period, even if a pigment dispersing resin or a surfactant is not added, or if mechanical dispersion treatment is not conducted, therefore, the oxidized carbon black as pigment does not precipitate in an ink container. Further, when the aqueous pigment ink composition of the present invention is added with a specific water-soluble resin, water resistance of the recorded traces are further improved.

The aqueous pigment ink composition of the present invention shows excellent recording and writing properties when it is used as a recording ink in an ink jet method or as a writing ink of an aqueous ball point pen and the like, and enables high speed printing or writing. Thus, the written characters are not blurred even when the ink composition is used for stenography.

Further, the recorded traces such as letters and figures on a normal paper or a non-absorptive coated paper show excellent fastness property (light resistance and water resistance), and even when the recorded traces are immersed in water, the carbon black does not flow out, and when the recorded traces are exposed to day light, there occurs no decoloring, as occurs in a dye ink composition.

Furthermore, the ink composition of the present invention can include a carbon black in high concentration, and density of the recorded traces are excellent, and it is equivalent to or more than that of a water-soluble black dye.

EXAMPLES

The present invention will be further illustrated in detail by the following examples, but they are not to be construed to limit the scope of the invention.

Example 1

The commercially available acidic carbon black "MA-100" (300 parts, pH 3.5)[manufactured by Mitsubishi Kagaku K.K.] was mixed in 1000 parts of water and the mixture was finely dispersed by completely stirring. To this was added dropwise 450 parts of sodium hypochlorite (effective chlorine concentration of 12%) and the resulting mixture was stirred for 10 hours at a temperature of from 100° to 105° C. The resulting slurry was filtrated through Toyo filter paper No. 2 (manufactured by Advantest Corp.), and was washed with water until the pigment particles leaked out. This pigment wet cake was re-dispersed in 3000 parts of water, controlled the pH value to 2 with hydrochloric acid, then desalted by using a reverse osmosis membrane until the electric conductivity reached 5 mS.

An aqueous dispersion of the oxidized carbon black before adding an amine compound, was concentrated to a concentration of 10% by weight, and water dispersibility was evaluated. As a result, dispersibility was extremely improved by comparison with the commercially available acidic carbon black. The result is shown in Table 2 as a reference example.

Then, to the pigment dispersion was added aqueous ammonia to control the pH value within the range of from 10 to 10.5, and it was desalted again with a reverse osmosis membrane until the electric conductivity reached 0.5 mS. The pigment dispersion was concentrated to a pigment concentration of 10% by weight.

The resulting pigment dispersion was further concentrated, dried and finely ground to obtain a fine powder of oxidized carbon black. The resulting oxidized carbon black had an oxygen content (% by weight) of 8%.

The oxygen content (% by weight) of the oxidized carbon black was measured according to the inert gas melting-infrared absorption method (JIS Z2613-1976 method) in the condition shown in Table 1.

TABLE 1

| Analysis Condition | |
|---|---|
| Apparatus | HERAEUS CHN—O RAPIO automatic element analysis apparatus |
| Sample decomposition furnace temperature | 1140° C. |
| Fractionation tube temperature | 1140° C. |
| Flow gas | $N_2/H_2$ = 95%/5% mixed gas |
| Rate of flow gas | 70 ml/min |
| Detector | non-dispersing spectrometer (Binos) |

Example 2

To 50 parts of the pigment dispersion obtained in Example 1 were added 5 parts of ethanol and 5 parts of 2-methyl pyrrolidone and further was added water to make up a total amount of 100 parts, thereby an aqueous pigment ink composition was obtained. This ink composition had a viscosity of not more than 2 cps/25° C., and the carbon black had an average particle size of 150 nm.

In this example, the average particle size of the oxidized carbon black was measured by using a dynamic light scatter measuring apparatus (laser-doppler scattered light analysis mode, trade name: "Microtrack UPA", manufactured by LEEDS & NORTHRUP Corp.). The viscosities of the aqueous dispersion of oxidized carbon black and the aqueous pigment ink composition were measured by E type viscometer (trade name: "ELD", manufactured by Tokyo Keiki K.K.).

An ink jet recording apparatus [trade name: HG5130 (manufactured by Epson K.K.)] was charged with the pigment ink composition and printed. The printing did not cause clogging in a nozzle, and the printed traces had excellent water resistance. The dried traces were immersed in water, but the pigment did not flow out. The nozzle used was one as for aqueous dye ink. The pigment ink composition did not set in the nozzle, and no discharge failure occurred in the second printing test after several hours. The ink composition was stored at 50° C. for 1 month, but the pigment did not precipitate, the average particle size and viscosity did not change. The printing test was conducted again. As a result, the discharge was stable and the writing was smooth. The optical density of solid printing portion was measured by Macbeth densitometer TR-927 (manufactured by Kolmorgen Corp.) to find 1.38. The value is fully sufficient.

Example 3

Commercially available carbon black "#45" (300 parts, pH 8.0) [manufactured by Mitsubishi Kagaku K.K.] was completely mixed with 1000 parts of water, then, 600 parts of sodium hypochlorite (effective chlorine concentration of 12%) was added dropwise, and the mixture was stirred for 8 hours at a temperature of from 100° to 105° C. To this was further added 150 parts of sodium hypochlorite, then the mixture was dispersed by a bead mill for 3 hours. The resulting slurry was diluted to ten-fold by volume, and was desalted by a reverse osmosis membrane until the electric conductivity reached 5 mS. Further, the pH value of the pigment dispersion was controlled within the range of from 9.5 to 10 using triethanolamine. The mixture was heated (80° to 95° C.) for 1 hour with stirring to completely form a triethanolamine salt (that is, the same meaning as "make into triethanol ammonium salt") and it was desalted again by a reverse osmosis membrane until the electric conductivity reached 0.5 mS. Thereafter, the dispersion was concentrated to a pigment concentration of 20% by weight.

The resulting pigment dispersion was further concentrated, dried and finely ground to obtain a fine powder of oxidized carbon black. The resulting oxidized carbon black had an oxygen content (% by weight) of 10%.

Example 4

To 25 parts of the pigment dispersion obtained in Example 3 was added 10 parts of ethanol and further was added water to make up a total amount of 100 parts, thereby an aqueous pigment ink composition was obtained. This ink composition had a viscosity of not more than 1.8 cps/25° C., and the carbon black had an average particle size of 60 nm.

The ink jet recording apparatus was charged with the pigment ink composition in the same manner as in Example 2 and printed. The printing did not cause clogging in a nozzle, and the printed traces had excellent water resistance. The dried traces were immersed in water, but the pigment did not flow out. The nozzle used was conventional one as for aqueous dye ink. The pigment ink composition did not set in the nozzle, and no discharge failure occurred in the second printing test after several hours. The ink composition was stored at 50° C. for 1 month, but the pigment did not precipitate, and the average particle size and viscosity did not change. The printing test was conducted again. As a result, the discharge was stable, and the writing was smooth.

Example 5

Acidic carbon black obtained by the channel method "Color carbon black FW200" (250 parts, pH 2.5) [manufactured by Degussa Corp.] was completely mixed with 1000 parts of water, then, 450 parts of sodium hypochlorite (effective chlorine concentration of 12%) was added dropwise, and the mixture was stirred for 8 hours at a temperature of from 100° to 105° C. To this was further added 150 parts of sodium hypochlorite, then the mixture was dispersed by a bead mill for 3 hours. The resulting slurry was diluted to ten-fold by volume, and was desalted by a reverse osmosis membrane until the electric conductivity reached 5 mS. Further, the pH value of the pigment dispersion was controlled within the range of from 9.5 to 10 using dimethylethanolamine. The mixture was heated (80° to 95° C.) for 1 hour with stirring to form dimethylethanolamine salt, and it was desalted again by a reverse osmosis membrane until the electric conductivity reached 0.5 mS. Thereafter, the dispersion was concentrated to a pigment concentration of 20% by weight.

The resulting pigment dispersion was further concentrated, dried and finely ground to obtain a fine powder of oxidized carbon black. The resulting oxidized carbon black had an oxygen content (% by weight) of 20%.

Example 6

To 25 parts of the pigment dispersion obtained in Example 5 were added 5 parts of ethanol and 5 parts of 2-methylpyrrolidone and further was added water to make up a total amount of 100 parts, thereby an aqueous pigment ink composition was obtained. This ink composition had a viscosity of not more than 1.8 cps/25° C., and the carbon black had an average particle size of 90 nm. The ink jet recording apparatus was charged with the pigment ink composition in the same manner as in Example 2 and printed. The printing did not cause clogging in a nozzle, and the printed traces had excellent water resistance. The dried traces were immersed in water, but the pigment did not flow out. The nozzle used was conventional one as for aqueous dye ink. The pigment ink composition did not set in the nozzle, and no discharge failure occurred in the second printing test after several hours. The ink composition was stored at 50° C. for 1 month, but the pigment did not precipitate, and the average particle size and viscosity did not change. The printing test was conducted again. As a result, the discharge was stable, and the writing was smooth.

Example 7

A mixture of 300 parts of carbon black "#900" (pH 8.0) [manufactured by Mitsubishi Kagaku K.K.] and 2700 parts of water was dispersed for 3 hours using a horizontal wet dispersing machine filled with zirconia beads having a diameter of 1 mm, to prepare a carbon black aqueous dispersion. The resulting dispersion (3000 parts) was charged to a 4-necked flask, to this was added 1500 parts of sodium hypochlorite (effective chlorine concentration of 12%), and the mixture was stirred for 8 hours at a temperature from 100° to 105° C. Then, the dispersion was filtrated, and the resulting wet cake was dispersed again in 3000 parts of water, and was desalted by a reverse osmosis membrane until the electric conductivity reached 5 mS. The pH value of the pigment dispersion was controlled within the range of from 10 to 10.5 using aqueous ammonia to make into ammonium salt, and it was desalted again by a reverse osmosis membrane until the electric conductivity reached 0.5 mS. Thereafter, the dispersion was concentrated to a pigment concentration of 10% by weight. This ink composition had a viscosity of 4 cps/25° C., and the carbon black had an average particle size of 50 nm.

Then, the resulting pigment dispersion was further concentrated, dried and finely ground to obtain a fine powder of oxidized carbon black. The resulting oxidized carbon black had an oxygen content (% by weight) of 11.5%.

Comparative Example 1

To 5 parts of acidic carbon black "MA-100" (pH 3.5) [manufactured by Mitsubishi Kagaku K.K.] were added 85 parts of water, 5 parts of ethanol and 5 parts of 2-methylpyrrolidone to make up a total amount of 100 parts, and the mixture was completely stirred to obtain an aqueous pigment ink composition. However, the acidic carbon black did not disperse in water sufficiently, and supernatant was formed when the resulting dispersion was allowed to stand still for a few minutes. Therefore, the printing by using the dispersion was impossible. The oxygen content of the acidic carbon black was measured to find 1.6%.

Comparative Example 2

To 5 parts of acidic carbon black "Color carbon black FW200" (pH 2.5) [manufactured by Degussa Corp.] were added 85 parts water, 5 parts of ethanol and 5 parts of 2-methylpyrrolidone to make up a total amount of 100 parts, and the mixture was completely stirred to obtain an aqueous pigment ink composition. However, the acidic carbon black did not disperse in water sufficiently, and supernatant was formed when the resulting dispersion was allowed to stand still for a few minutes. Therefore, the printing by using the dispersion was impossible. The oxygen content of the acidic carbon black was measured to find 15%.

Comparative Example 3

To 100 parts of carbon black which has not been oxidized "#45" (pH 8.0) [manufactured by Mitsubishi Kagaku K.K.] were added 100 parts of "Johncryl J-62" (acrylic resin aqueous solution manufactured by Johnson Polymer Corp.) and 300 parts of water. The resulting was dispersed for 5 hours by using a beads mill to obtain an average particle size of 120 nm.

To 25 parts of this dispersion were added 5 parts of ethanol and 5 parts of 2-methylpyrrolidone and further was added water to make up a total amount of 100 parts, thereby an aqueous pigment ink composition was obtained. The aqueous pigment ink composition had a viscosity of 4 cps/25° C., and stability of the dispersion was good. The ink jet recording apparatus was charged with the aqueous pigment ink composition and printed. Discharge stability of the ink gradually became poor and density of the printed traces also became blur. The nozzle used was conventional one as for aqueous dye ink. The pigment ink composition was dried, and in the second printing test after a few hours, the density further decreased. When the above-described procedure was repeated, there occurred discharge failure and the printing became impossible at all.

Comparative Example 4

Carbon black "#900" (pH 8.0, 10 parts) [manufactured by Mitsubishi Kagaku K.K.] was dispersed in 30 parts of water, and 5 parts of sodium hypochlorite having an effective chlorine concentration of 12% was added, and the mixture was stirred for 24 hours at an ambient temperature (20° to 250C.). Then, supernatant was removed, precipitated carbon black cake was dispersed in methanol, and it was filtrated. By repeating this procedure, the reaction solvent was substituted by methanol. As a result, the reaction solvent and by-product contained therein were completely removed, and powder of oxidized carbon black was obtained by drying.

To 5 parts of the resulting oxidized carbon black (pH 8) were added 85 parts water, 5 parts of ethanol and 5 parts of 2-methylpyrrolidone to make up a total amount of 100 parts, and the mixture was completely stirred to obtain an aqueous pigment ink composition. The aqueous pigment ink composition was allowed to stand still for a few minutes, and supernatant was formed. Therefore, the printing by using the aqueous pigment ink was impossible.

As summarized in the following Table 2, the oxygen content and water dispersibility were compared with respect to the oxidized carbon black obtained in Examples 1, 3, 5 and 7 of the present invention, commercially available carbon blacks "MA100", "#45" and "#900" (respectively manufactured by Mitsubishi Kagaku K.K.), and "Color black FW200" (manufactured by Degussa Corp.).

Water dispersibility (water affinity and stability with the lapse of time) of the samples was evaluated. The carbon black obtained by the present invention was finely dispersed quickly and was stable after it was allowed to stand still for 60 days. On the contrary, the commercially available carbon black floated on a water surface, even in the beginning of the dispersing step, or it precipitated with the lapse of time.

As described above, it can be understood that the water dispersibility of the carbon black in the pigment ink composition of the present invention is surprisingly high.

TABLE 2

| kind of carbon black | Water dispersibility | | | | Oxygen content (% by weight) |
|---|---|---|---|---|---|
| | acidic pH | | Alkaline pH | | |
| | Water affinity | Stability with the lapse of time | Water affinity | Stability with the lapse of time | |
| Example 1 | ◎ | not less than 40 days | ◎ | not less than 60 days | about 8 |
| Example 3 | ◎ | not less than 40 days | ◎ | not less than 60 days | about 10 |
| Example 5 | ◎ | not less than 60 days | ◎ | not less than 90 days | about 20 |
| Example 7 | ◎ | not less than 50 days | ◎ | not less than 90 days | about 11 |
| Reference Example | ◎ | 30 days | ◎ | not less than 60 days | |
| MA100 (Comparative Example 1) | x | not more than 1 minute | x | not more than 1 minute | about 1.5 |
| FW200 (Comparative Example 2) | Δ | not more than 5 minutes | Δ | not more than 8 minutes | about 15 |
| #45 (Comparative Example 3) | x | not more than 1 minute | x | not more than 1 minute | about O.5 |
| #900 (Comparative Example 4) | x | not more than 1 minute | x | not more than 1 minute | about O.5 |

[evaluation standard]
◎: quickly and finely dispersed; water affinity is excellent
Δ: dispersed, but insufficiently; water affinity is insufficient
x: did not disperse; water affinity is poor Example 8

Commercially available acidic carbon black "MA-100" (300 parts, pH 3.5)[manufactured by Mitsubishi Kagaku K.K.] was mixed in 1000 parts of water and the mixture was finely dispersed by completely stirring. To this was added dropwise 450 parts of sodium hypochlorite (effective chlorine concentration of 12%) and the resulting mixture was stirred for 10 hours at a temperature of from 100° to 105° C. The resulting slurry was filtrated through Toyo filter paper No. 2 (manufactured by Advantest Corp.), and was washed with water until the pigment particles leaked out. This pigment wet cake was re-dispersed in 3000 parts of water, then it was desalted by using a reverse osmosis membrane until the electric conductivity reached 0.2 mS. The pigment dispersion (pH 6 to 7) was concentrated to a pigment concentration of 10% by weight.

The resulting pigment dispersion was further concentrated, dried and finely ground to obtain a fine powder of oxidized carbon black. The resulting oxidized carbon black had an oxygen content (% by weight) of 8%.

The oxygen content (% by weight) of the carbon black (or the oxidized carbon black) was measured according to the inert gas melting-infrared absorption method (JIS Z2613-1976 method) in the same condition as that of Example 1.

Example 9

To 50 parts of the pigment dispersion obtained in Example 8 were added 5 parts of ethanol and 5 parts of 2-methyl pyrrolidone, and to the resulting mixture was further added a liquid which had been separately prepared by mixing 5 parts of Mulkyd 32 [rosin modified acrylic resin manufactured by Arakawa Kagaku Kogyo K.K.: acid value 140, average molecular weight 1090 ], 1 part of 28% aqueous ammonia, 0.5 parts of diethanolamine, and 33.5 parts of water, to obtain an aqueous pigment ink composition.

This ink composition had a viscosity of not more than 2 cps/25° C., and the carbon black had an average particle size of 150 nm.

In this example, the average particle size of the oxidized carbon black was measured by using a laser beam scattering type particle size distribution measuring apparatus [manufactured by Otsuka Denshi K.K., trade name: LPA3000/3100].

An ink jet recording apparatus [trade name: HG5130 (Epson K.K.)] was charged with the pigment ink composition and printed on a normal paper. The pigment ink composition was stably discharged, and quickly printed. The recorded traces had gloss and had excellent water resistance. The dried traces were immersed in water, but the pigment did not flow out. The nozzle used was conventional one as for aqueous dye ink. The pigment ink composition did not set in the nozzle, and no discharge failure occurred in the second printing test after several hours.

The ink composition was stored at 50° C. for 1 month, but the pigment did not precipitate, the average particle size and viscosity did not change. The printing test was conducted again. As a result, the discharge was stable, and the writing was smooth. The optical density of solid printing portion was measured by Macbeth densitometer TR-927 (manufactured by Kolmorgen Corp.) to find 1.34, the fully sufficient value.

The pigment ink composition (1 part) was charged into a petri dish, it was dried for 12 hours in a drying machine at 40° C. Then to the dried pigment ink composition was added 2 parts of the original ink composition. The resulting mixture was slightly shaken. As a result, the solid completely dissolved within 30 seconds. This means that the aqueous pigment ink composition of the present invention is excellent in re-dissolution property.

Example 10

Commercially available carbon black "MA-8" (300 parts, pH 3.5) [manufactured by Mitsubishi Kagaku K.K.] was completely mixed with 1000 parts of water. To this was added 450 parts of sodium hypochlorite (effective chlorine concentration of 12%) dropwise, and the mixture was stirred for 8 hours at a temperature of from 100° to 105° C. To this reaction liquid was further added 100 parts of sodium hypochlorite, then the mixture was dispersed by a horizontal dispersing machine for 3 hours to control the average particle size of the carbon black to about 100 nm. The resulting slurry was diluted to ten-fold by volume, the pH value thereof was controlled to 2 by aqueous hydrochloric acid, and it was desalted by using a reverse osmosis membrane until the electric conductivity reached 0.5 mS. Further, the pH value of the pigment dispersion was controlled within the range of from 9.5 to 10 by using triethanolamine. The mixture was heated (80° to 95° C.) for 1 hour with stirring to make into a triethanolamine salt. The pigment dispersion was then concentrated to a pigment concentration of 20% by weight.

Separately, the pigment dispersion was concentrated, dried and finely ground to obtain a fine powder of oxidized carbon black. The resulting carbon black had an oxygen content (% by weight) of 10%.

Example 11

To 25 parts of the pigment dispersion obtained in Example 10 were added 47.5 parts of water, 5 parts of ethanol, 5 parts of 2-methylpyrrolidone, 17 parts of Johncryl J501 [styrene-maleic acid modified acrylic resin manufactured by Johnson Polymer Corp.: 29.5% aqueous solution (neutralized by aqueous ammonia), acid value 205, average molecular weight 12000] and 0.5 parts of triethylamine, and the resulting mixture was completely stirred to obtain an aqueous pigment ink composition.

This ink composition had a viscosity of not more than 1.8 cps/25° C., and the carbon black had an average particle size of 100 nm.

The ink jet recording apparatus was charged with the pigment ink composition in the same manner as Example 9 and printed on an acidic paper. The pigment ink composition was stably discharged, and quickly printed. The recorded traces had gloss and had excellent water resistance. The dried traces were immersed in water, but the pigment did not flow out. The nozzle used was conventional one as for aqueous dye ink. The pigment ink composition did not set in the nozzle, and no discharge failure occurred in the second printing test after several hours.

The ink composition was stored at 50° C. for 1 month, but the pigment did not precipitate, the average particle size and viscosity did not change. The printing test was conducted again. As a result, the discharge was stable, and the writing was smooth.

The pigment ink composition (1 part) was charged into a petri dish, it was dried for 12 hours in a drying machine at 40° C. Then to the dried pigment ink composition was added 2 parts of the original ink composition. The resulting mixture was slightly shaken. As a result, the solid completely dissolved within 30 seconds.

Comparative Example 5

To 500 parts of acidic carbon black "MA-100" (pH 3.5) [manufactured by Mitsubishi Kagaku K.K.] were added 833 parts of Mulkyd 32-30WS [30% aqueous solution of Mulkyd 32 (neutralized by aqueous ammonia)] and 300 parts of water, and the mixture was dispersed by a dispersing machine until an average particle size became about 150 nm. Thereafter, it was diluted with water until the pigment content reached 20%.

To 25 parts of this slurry were added 5 parts of ethanol and 5 parts of 2-methylpyrrolidone to make up a total amount of 100 parts, and the mixture was completely stirred to obtain an aqueous pigment ink composition. This ink composition had a viscosity of not more than 4.5 cps/25° C.

The ink jet recording apparatus was charged with the aqueous pigment ink composition in the same manner as Example 9, and printed on a normal paper. The amount discharged of the ink composition became small, and density of the printed traces gradually decreased, and finally the discharge of ink stopped. Further, in the second printing test after several hours, the nozzle clogged and did not recover.

This ink composition (1 part) was charged into a petri dish, it was dried for 12 hours in a drying machine at 40° C. Then to the dried pigment ink composition was added 2 parts of the original ink composition. The resulting mixture was slightly shaken. As a result, the solid did not completely dissolve after 5 minutes, and the undissolved components remained.

Comparative Example 6

To 50 parts of the pigment dispersion obtained in Example 8 were added 5 parts of ethanol, 5 parts of 2-methylpyrrolidone, 0.5 parts of triethylamine and water to obtain 100 parts of an aqueous pigment ink composition.

This ink composition had a viscosity of not more than 1.5 cps/25° C., and the carbon black had an average particle size of 150 nm.

The ink jet recording apparatus was charged with the aqueous pigment ink composition in the same manner as Example 9, and printed on a coated paper having no absorbing property. The pigment ink composition was stably discharged, and quickly printed. The recorded traces however had no gloss and had poor water resistance. The dried traces were immersed in water after drying, the pigment flowed out.

Comparative Example 7

A pigment ink composition was prepared using the following formulation in the same manner as described in Example 11, except that SMA 1000A [Elfatochem, styrene-maleic acid resin: acid value 480, molecular weight 1600] was used instead of Johncryl J501 used in Example 11.

TABLE 3

| Components | Amounts (parts) |
| --- | --- |
| 20% pigment dispersion (Example 3) | 25.0 |
| SAM 1000A | 5.0 |
| water | 57.5 |
| ethanol | 5.0 |
| 2-methylpyrrolidone | 5.0 |
| 28% aqueous ammonia | 2.0 |
| triethanolamine | 0.5 |

This ink composition had a viscosity of not more than 2.0 cps/25° C., and the carbon black had an average particle size of 100 nm.

The ink jet recording apparatus was charged with the aqueous pigment ink composition in the same manner as Example 9, and printed on a normal paper. The pigment ink composition was stably discharged, and quickly printed. The recorded traces had gloss, however, when the traces were immersed in water after drying, the pigment flowed out and blurred.

What is claimed is:

1. An aqueous pigment ink composition comprising water and oxidized carbon black dispersed stably in the water, wherein said oxidized carbon black is obtained by oxidizing carbon black using hypohalous acid and/or salt thereof and wherein at least a part of an acidic group existing on the surface of said oxidized carbon black associates with an amine compound to form an ammonium salt.

2. The aqueous pigment ink composition according to claim 1, wherein said amine compound is a water-soluble volatile amine.

3. The aqueous pigment ink composition according to claim 1, wherein said oxidized carbon black is obtained by oxidizing carbon black in the condition that the carbon black is finely dispersed in water.

4. The aqueous pigment ink composition according to claim 1, wherein said oxidized carbon black is obtained by oxidizing carbon black in the condition that the carbon black is finely dispersed in water, using hypohalous acid and/or salt thereof.

5. The aqueous pigment ink composition according to claim 1, wherein said oxidized carbon black has an average particle size of not more than 300 nm.

6. The aqueous pigment ink composition according to claim 1, wherein said oxidized carbon black has an oxygen content of not less than 5.0% by weight.

7. The aqueous pigment ink composition according to claim 1, comprising said oxidized carbon black in an amount of from 0.1 to 50% by weight based on the total amount of the aqueous pigment ink composition.

8. The aqueous pigment ink composition according to claim 1, comprising no pigment dispersing agent.

9. A process for producing an aqueous pigment ink composition comprising water and oxidized carbon black dispersed stably in the water, which comprises the steps of:

oxidizing carbon black in the condition that the carbon black is finely dispersed in water, using hypohalous acid and/or salt thereof; and neutralizing at least a part of an acidic group existing on the surface of the resulting oxidized carbon black, with an amine compound.

10. The process according to claim 9, wherein said amine compound is a water-soluble volatile amine.

11. The aqueous pigment ink composition according to claim 1 further comprising a water-soluble resin, wherein said water-soluble resin is an acrylic polymer having a weight average molecular weight of not more than 50000 and an acid value of from 100 to 250.

12. The aqueous pigment ink composition according to claim 1, wherein said water-soluble resin is neutralized with a volatile base compound selected from the group consisting of ammonia, amine, alkanolamine and alkylalkanolamine, and is dissolved in an aqueous medium.

13. The aqueous pigment ink composition according to claim 1, comprising said water-soluble resin in amount of from 0.1 to 20% by weight based on the total amount of the aqueous pigment ink composition.

14. An ink composition for ink jet recording which comprises the aqueous pigment ink composition of claim 1.

15. An ink composition for a writing implement which comprises the aqueous pigment ink composition of claim 1.

* * * * *